Dec. 13, 1927.

O. LAMBERT 1,652,721

SELF DOFFING MECHANISM FOR SPINNING, TWISTING, AND LIKE FRAMES

Filed April 7, 1927

7 Sheets-Sheet 1

Inventor.
O. Lambert

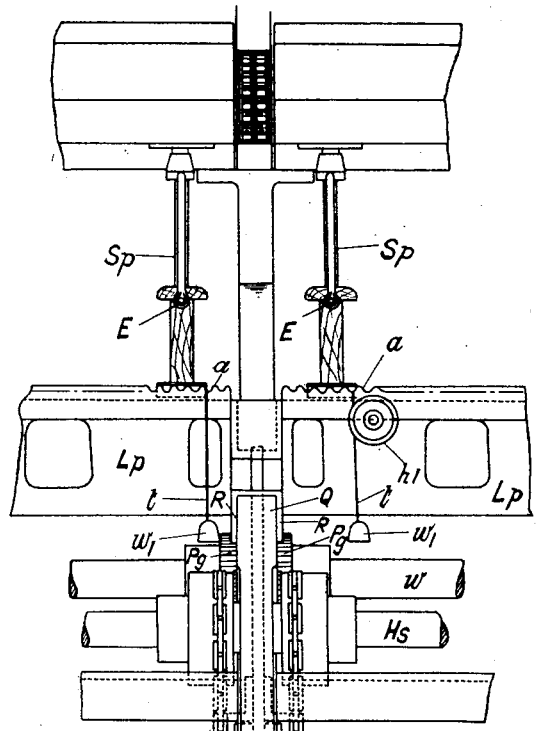
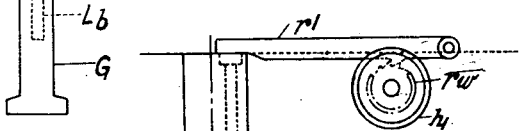
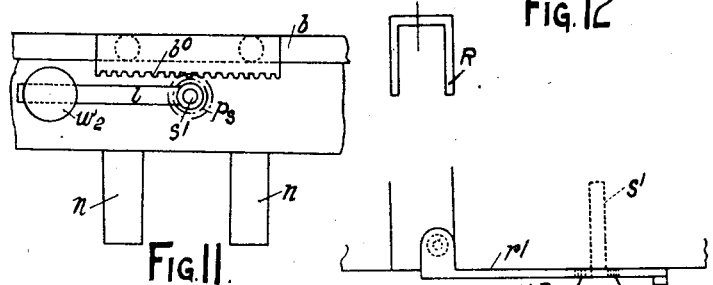
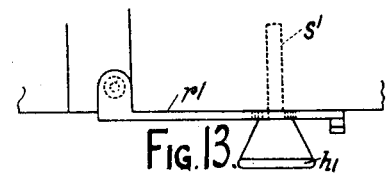

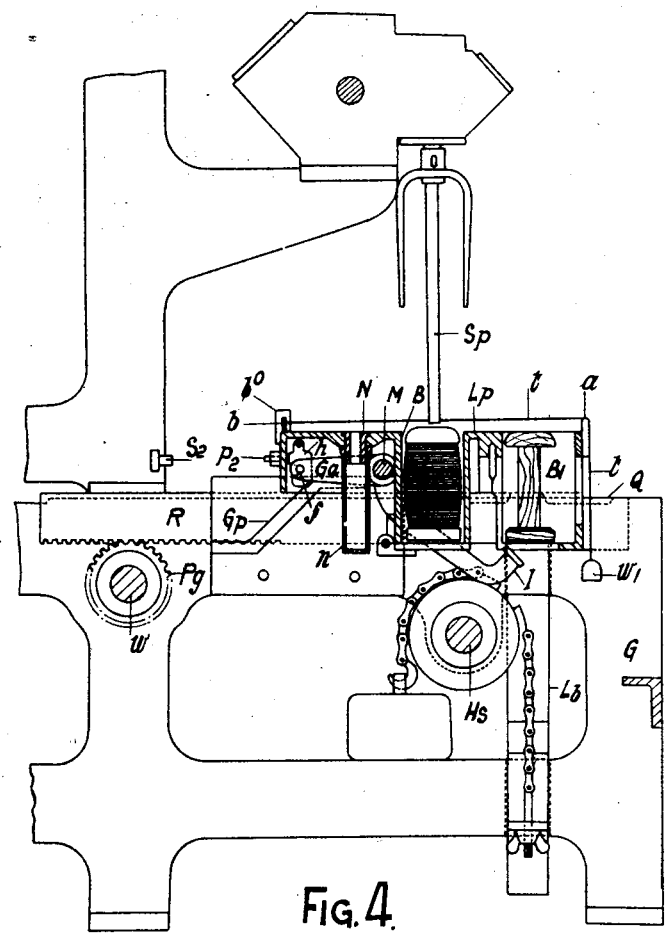
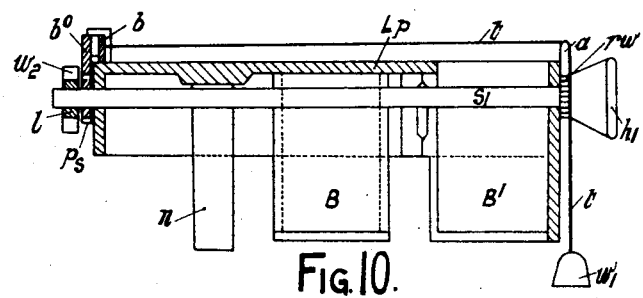

Dec. 13, 1927.  
O. LAMBERT  
1,652,721  
SELF DOFFING MECHANISM FOR SPINNING, TWISTING, AND LIKE FRAMES  
Filed April 7, 1927     7 Sheets-Sheet 5

Inventor.  
O. Lambert

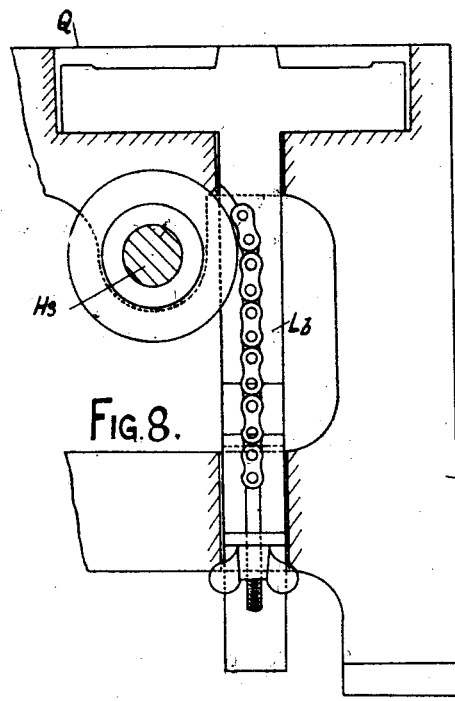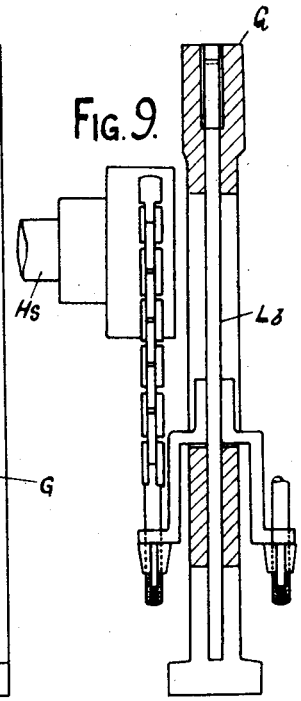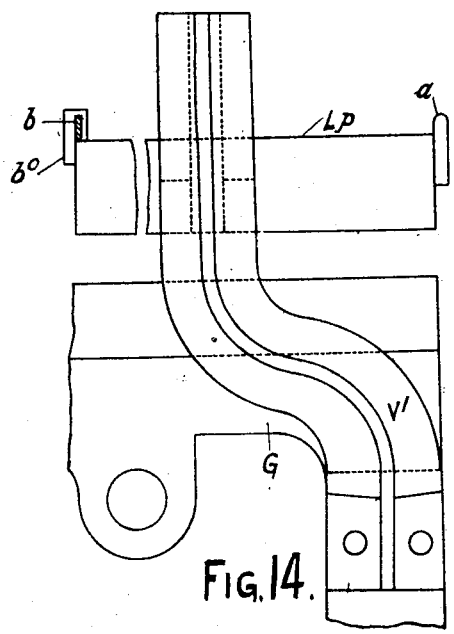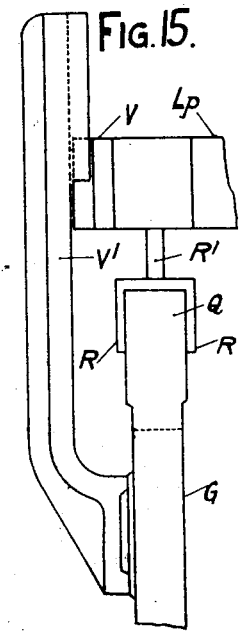

Patented Dec. 13, 1927.

1,652,721

UNITED STATES PATENT OFFICE.

OSWALD LAMBERT, OF TAMISE, BELGIUM, ASSIGNOR TO JAMES F. LOW & COMPANY, LIMITED, OF MONIFIETH, SCOTLAND.

SELF-DOFFING MECHANISM FOR SPINNING, TWISTING, AND LIKE FRAMES.

Application filed April 7, 1927, Serial No. 181,851, and in Great Britain May 7, 1926.

This invention relates to spinning, twisting and like frames, particularly for the cotton, jute, hemp and flax spinning and twisting industries.

More particularly the invention is concerned with a self-doffing mechanism comprising a vertically movable lifter plate or the like carrying a neck or bearing that receives the lower end of the spindle, a box to receive a full bobbin and a box or channel to carry an empty bobbin, means for imparting horizontal reciprocating movements to the lifter plate or the like to bring the bearing member and the boxes successively into register with the spindle and means for transferring an empty bobbin from the second box or channel to the spindle.

In the interest of simplicity of explanation it is assumed in the foregoing that only a single spindle is fitted. As is well understood, however, the frame is equipped with a series of spindles and associated elements.

Figure 1:
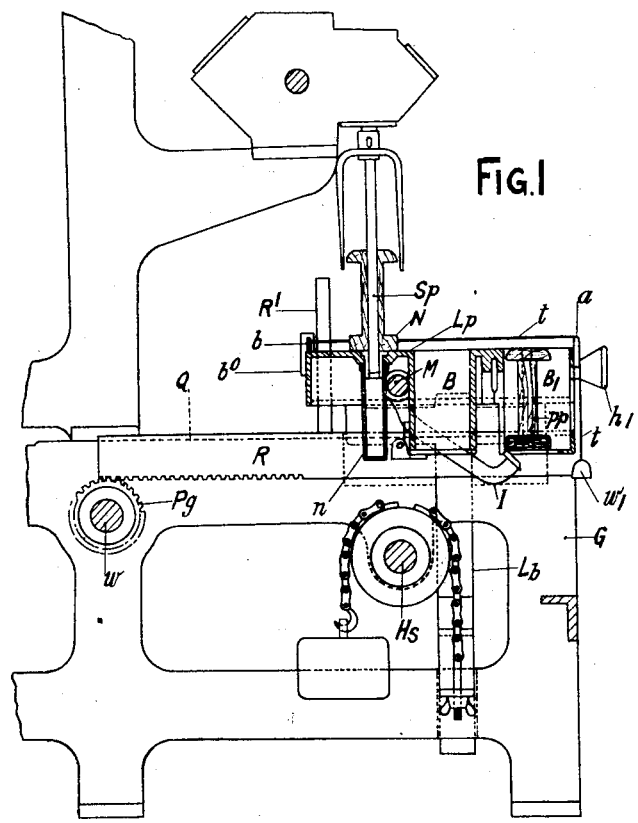
Figure 3:
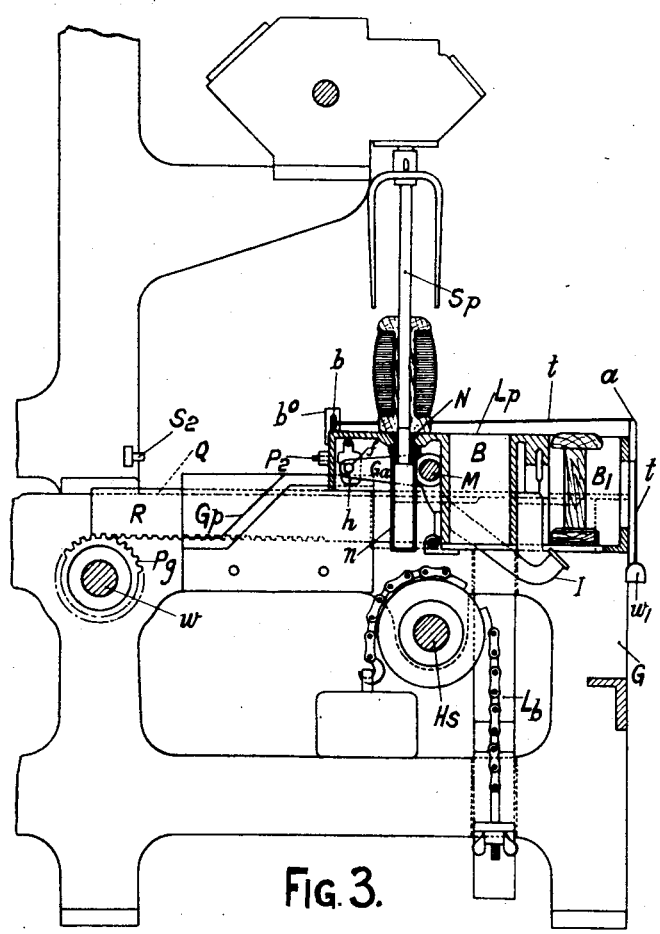
Figure 5:
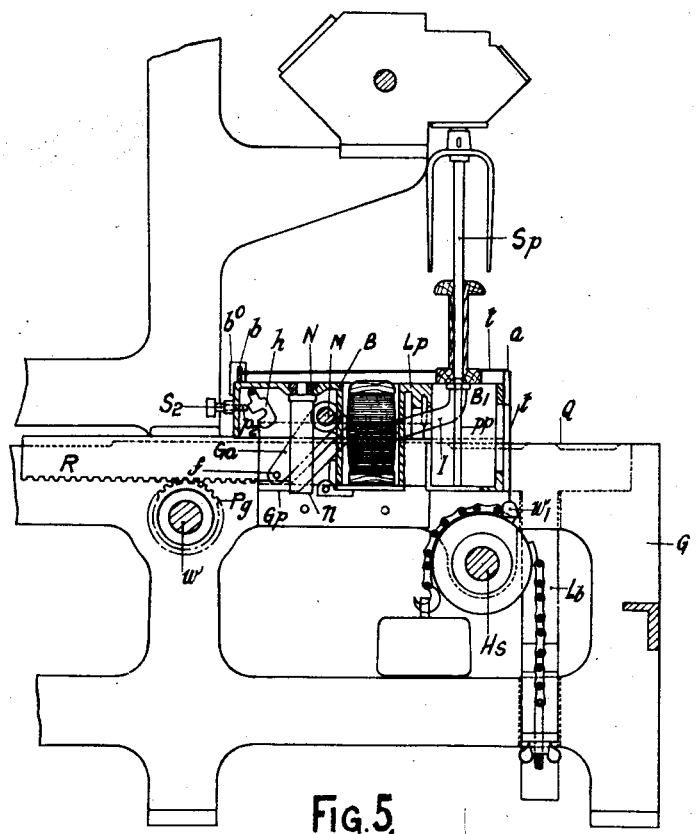
Figure 6:
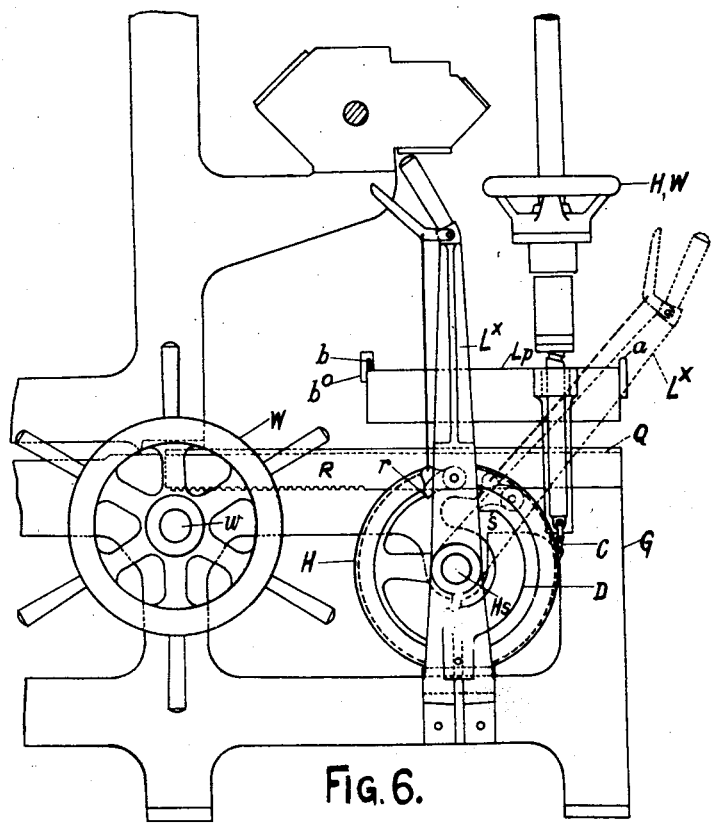

In the accompanying drawings which illustrate the invention Fig. 1 is a part elevation part vertical section showing clearly the spindle and certain essential elements of the doffing mechanism. Fig. 2 is an elevation at right angles to Fig. 1. Figs. 3, 4 and 5 are views similar to Fig. 1 showing parts of the doffing mechanism in different positions. Fig. 6 is an elevation showing the means of imparting vertical movements to the lifter plate. Figs. 7 to 15 show details.

As shown in the drawings, the flyer spindles $Sp$ are top-driven; the spindle driving mechanism forms, however, no part of the invention.

The doffing mechanism illustrated includes the lifter plate $Lp$ adapted to perform horizontal reciprocating movements on slideways Q presented by the frame members G. Such horizontal movements are imparted to the lifter plate by operation of a wheel W, Fig. 4, mounted on a shaft $w$ at the draft end of the frame and serving to actuate gear wheels $Pg$, Figs. 1; 2, 3, 4 and 5 which mesh with racks R operatively connected to the lifter plate $Lp$ through the medium of guide rods $R^1$, Fig. 1.

The lifter plate $Lp$ is also adapted to perform rising and falling movements, being engaged on the under side by lifter bars $Lb$ which may be moved vertically by rotation of a chain pulley H, Fig. 6, keyed to a shaft $Hs$ at the draft end of the machine, movement of this chain pulley being controlled by a chain $c$ from a heart-shaped cam in the usual manner. Attached to the chain $c$ is a quick thread screw in screw-threaded engagement with a hand wheel HW by turning which latter the chain $c$ is slackened so that the lifter plate $Lp$ may be lowered into doffing position upon the racks R. Also keyed to the shaft $Hs$ is a hand lever $L^x$. When the chain $c$ is slackened, the lever $L^x$ can be pulled over until a detent $r$ engages with a slot $s$ upon the guide D, the lifter bars $Lb$ being dropped clear of the lifter plate $Lp$ into the frame members G. Figs. 8 and 9 are detail views of the lifter bar mechanism.

The lifter plate $Lp$ carries, besides the bearing N, two boxes B and $B^1$ at one side of the bearing N.

The box $B^1$ is slotted for the passage of a tappet arm I and is fitted with a peg $p$ $p$. Arms I are mounted upon a shaft M journalled beneath the lifter plate $Lp$. An adjustable counter-balance weight is adapted to act on one end of the shaft M. At the other end of the shaft M is an arm $Ga$, terminating in a follower $f$ engageable by a latch $h$, and adapted, when unlatched, to track a cam $Gp$, which controls the movements of the arms I.

Figure 7:
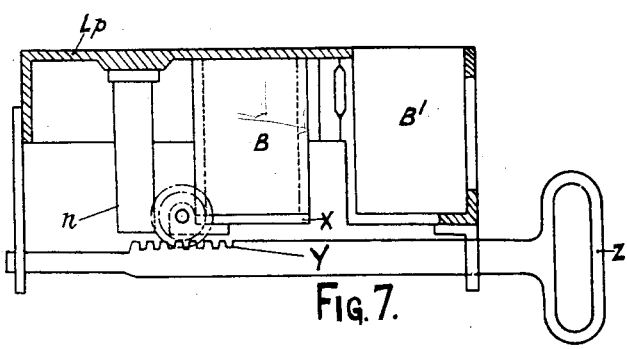

The boxes B are fitted with hinged bottoms $x$, Fig. 7, to allow the full bobbins to be dropped in front of the machine. For facility in collecting, all the hinged bottoms of the boxes B in each section are operated by means of a rack Y which may be unitary with the handle Z.

The tension cords $t$ extend over a serrated rail $a$ fixed to the front of the lifter plate $Lp$ and are each attached at one end to a weight $w^1$. The other end of the cord is tied to a sliding rail $b$ to which is fixed a rack $b^o$ meshing with a pinion $ps$. The pinion $ps$ is keyed to the shaft $s_1$ which passes through the lifter plate $Lp$ to the front of the same and carries the hand wheel $h_1$ and also the ratchet wheel $rw$ so that the tension of the cords may be adjusted by movement of the hand wheel $h_1$.

When, on doffing, the pin $p_1$ comes into contact with the rack R, the ratchet lever $r_1$ is lifted, the ratchet wheel $rw$ released and the weight $w^2$ allowed to fall, rocking the weight-carrying lever $l$ keyed to the shaft $s_1$, and so by means of the rack and pinion devices shifting the rail $b$ to move the cords $t$ clear of the bobbins.

Sliding brackets V, Figs. 14 and 15, and guide brackets $V^1$ fitted to the lifter plate ends and to the end frame members, respectively, guide the lifter plate $Lp$ rigidly during the spinning traverse. The guide brackets are arranged to allow the lifter plate to traverse in horizontal direction during the doffing operation.

The lower part of the spindle $Sp$, after doffing, is held rigidly in a neck or bearing N fixed in a lifter plate $Lp$ and provided at its lower end with a tube $n$ containing oil. ensuring lubrication of the spindle $Sp$ at each ascent of the lifter plate. The lower end of the spindle $Sp$ may be slightly tapered to guide it in the neck N after the doffing operation.

The operations effected in doffing are as follows:—

By operation of the hand wheel HW the lifter plate $Lp$ is lowered on to the racks R to disengage the spindle $Sp$ from the bearing N. The lever $L^x$ is then moved so that the detent $r$ engages the slot $s$ in the guide D, the lifting bars being dropped clear of the lifter plate.

The lifter plate is now moved backward by manipulating the hand wheel W. When the boxes B are under full bobbins on the same spindles, the full bobbins fall automatically into them and are retained in the boxes, as the hinged bottoms are closed. The lifter plate is now moved still further and bobbin pegs $p$ $p$ with empty bobbins thereon are brought into alignment with the spindles $Sp$. At the same time the pin $p_2$ comes into contact with the stop $s_2$ on the frame member, releasing the latch $h$ and allowing the lever or arm $Ga$ to fall. The shaft M is thus rocked and the arms I operated to lift the empty bobbins on to the spindles $Sp$.

By manipulation of the hand wheel W the lifter plate $Lp$ is moved horizontally forward, so that the bearings N are again beneath the spindles $Sp$. The empty bobbins on the spindles are kept from falling into the boxes B owing to the newly doffed full bobbins being retained therein. The arm $Ga$ is rocked by the cam $Gp$ and latched and the arms I drop to their lower positions, allowing a fresh set of empty bobbins to be placed upon the pins $p$ $p$.

The lever $L^x$ is then moved back to its original position, the detent $r$ being released. The lifter bars $Lb$ are thus raised and the lifter plate $Lp$ elevated to spinning position by operation of the hand wheel HW.

The frame is now again ready for spinning. A few turns of a hand wheel fixed on a gear shaft at the draft end of the frame will secure the yarn round the empty bobbins; the threads can then be cut and the frame restarted.

What I claim is:—

1. Self-doffing mechanism for spinning, twisting, and like frames, comprising, in combination with a spindle, a vertically movable lifter plate, a spindle-bearing member carried by said lifter plate, a full-bobbin receptacle on said lifter plate, an empty-bobbin-carrier on said lifter plate, means for imparting vertical movements to said lifter plate, means for imparting horizontal movement to said lifter plate to bring said member, receptacle and carrier successively into register with said spindle, and means for transferring an empty bobbin from said carrier to said spindle.

2. Self-doffing mechanism for spinning, twisting, and like frames, comprising, in combination with a spindle, a vertically movable lifter plate, a spindle-bearing member carried by said lifter plate, a full-bobbin receptacle on said lifter plate, an empty bobbin-carrier on said lifter plate, means for imparting vertical movements to said lifter plate, means for imparting horizontal movement to said lifter plate to bring said member, receptacle and carrier successively into register with said spindle, means for transferring an empty bobbin from said carrier to said spindle, and manually operable means for opening the bottom of the full-bobbin receptacle.

3. Self-doffing mechanism for spinning, twisting, and like frames, comprising, in combination with a spindle, a vertically movable lifter plate, a spindle-bearing member carried by said lifter plate, a full-bobbin receptacle on said lifter plate, an empty-bobbin carrier on said lifter plate, means for imparting vertical movements to said lifter plate, means for imparting horizontal movement to said lifter plate to bring said member, receptacle and carrier successively into register with said spindle, a lever for transferring an empty bobbin from said carrier to said spindle, and cam and follower devices for resetting said lever.

4. Self-doffing mechanism for spinning, twisting, and like frames, comprising, in combination with a spindle, a vertically movable lifter plate, a spindle-bearing member carried by said lifter plate, a full-bobbin receptacle on said lifter plate, an empty-bobbin carrier on said lifter plate, means for imparting vertical movements to said lifter plate, means for imparting horizontal movement to said lifter plate to bring said member, receptacle and carrier successively into register with said spindle, means for transferring an empty bobbin from said carrier to said spindle, and bobbin-braking and releasing means dependent for its operation on the vertical movement of said lifter plate.

In testimony whereof I have signed my name to this specification.

O. LAMBERT.